United States Patent [19]

Grimm

[11] Patent Number: 4,848,263

[45] Date of Patent: Jul. 18, 1989

[54] THROWABLE, MULTIPLE-SIDED, EMERGENCY TRAFFIC WARNING MARKER

[76] Inventor: Luke Z. Grimm, 2140 SW Palatine, Portland, Oreg. 97219

[21] Appl. No.: 167,864

[22] Filed: Mar. 14, 1988

[51] Int. Cl.⁴ .............................................. E01F 9/13
[52] U.S. Cl. ................................. 116/63 C; 116/63 P; 40/610; 273/428
[58] Field of Search ................ 116/63 P, 63 C, 63 T, 116/209; 248/DIG. 10; 350/97; 40/608, 610, 612; 206/107, 803, 822; 383/902, 907, 119; 273/415, 428

[56] References Cited

U.S. PATENT DOCUMENTS

| | | | |
|---|---|---|---|
| 2,483,734 | 10/1949 | Neal | 116/63 T |
| 2,887,930 | 5/1959 | Zoffmann | 116/63 T |
| 3,105,457 | 10/1963 | Krueger | 116/63 P |
| 3,386,409 | 6/1968 | Dawson | 116/63 P |
| 3,485,202 | 12/1969 | Platt, III | 116/63 P |
| 3,635,542 | 1/1972 | Parduhn | 350/97 |
| 3,699,913 | 10/1972 | Sautbine | 116/63 P |
| 3,800,735 | 4/1974 | Simpson | 116/63 P |
| 4,011,611 | 3/1977 | Lederman | 273/415 |
| 4,394,843 | 7/1983 | Ediriwira | 116/63 P |

FOREIGN PATENT DOCUMENTS

| | | | |
|---|---|---|---|
| 959082 | 5/1964 | United Kingdom | 116/63 P |
| 1362523 | 8/1974 | United Kingdom | 116/63 P |
| 2145452 | 3/1985 | United Kingdom | 116/63 T |

Primary Examiner—William A. Cuchlinski, Jr.
Assistant Examiner—W. Morris Worth
Attorney, Agent, or Firm—Eugene D. Farley

[57] ABSTRACT

A throwable, multi-sided emergency traffic warning marker. The marker body comprises a plurality of traffic-warning display faces preferably arranged in a tetrahedral configuration. Traffic warning indicia are present on each face, imparting visibility thereto. The marker assembly is contoured and proportioned to insure display of one of the display faces to oncoming vehicles when the marker is thrown, dropped or otherwise placed on a roadway surface.

4 Claims, 1 Drawing Sheet

THROWABLE, MULTIPLE-SIDED, EMERGENCY TRAFFIC WARNING MARKER

BACKGROUND AND GENERAL STATEMENT OF THE INVENTION

The present invention relates to traffic warning markers. It pertains particularly today or night traffic warning markers having a tetrahedral configuration, contoured and proportioned to ensure the display of a warning display face to oncoming vehicles when the marker is thrown, dropped or otherwise placed on a roadway surface.

Traditionally, road hazard warnings have been designed to sit at road side, not matter how wide a freeway is (and some are now six lane, making road side virtually invisible). The present device is tailored for use on present-day free-ways having need for marking lanes at any distance away from road side, night or day.

Although many types of traffic warning markers heretofore have been devised and placed in service, none of them is capable of effective deployment by a person who is trapped in a disabled vehicle, or for one reason or another is unable to leave a vehicle parked alongside a busy highway.

Furthermore, ambulatory drivers able to leave disabled vehicles frequently find themselves exposed to passing traffic and may themselves become involved in an accident. Studies show that when vehicles become disabled, motorists tend to stand near the vehicle, examine or work on the vehicle, or walk along the roadway near the vehicle, seeking aid. The presence of such dismounted motorists in unexpected locations and their pre-occupation with the disabled vehicle contribute to the hazard of the situation It is the general purpose of the present invention to provide a marker which can be deployed from within or without the vehicle by throwing it or tossing it upon the roadway or adjacent surface without walking down the highway for manual marker placement.

It is a further important object of the invention to provide traffic warning markers of such a character that a plurality of them may be carried conveniently in the vehicle, to be deployed in a desired pattern on the highway or adjacent surface as desirable and necessary to protect both the vehicle and dismounted driver.

Further important objects of the invention are the provision of a traffic warning marker which, when thrown out of a vehicle window, always will land right side up; which does not interfere with oncoming traffic after deployment; which is highly visible; which is durable in service, being capable of being run over; which is foldable and stackable for easy transportation and storage when not in use; and which is of relatively low cost so that a plurality of the markers may economically be carried and deployed by the vehicle driver.

Generally stated, the marker of the present invention satisfying the foregoing and other objects and purposes comprises a marker body having a plurality of traffic-warning display faces and no required base, functioning the same no matter which face faces downwardly. The body preferably is tetrahedral in configuration, to provide four such display faces.

Traffic warning indicia are mounted on each face, imparting enhanced visibility thereto.

The marker assembly is contoured and proportioned to ensure display of a display face effectively to oncoming vehicles when the marker is thrown, dropped or otherwise placed on a roadway or adjacent surface.

THE DRAWINGS

DESCRIPTION OF PREFERRED EMBODIMENTS OF THE INVENTION

As indicated above, the traffic warning marker of my invention broadly comprises a marker body having a plurality of traffic-warning display faces and traffic warning indicia on each face imparting enhanced visibility thereto. The marker preferably has a tetrehedral contour.

FIGS. 1-8 inclusive illustrate the marker in a preferred "bean bag" embodiment which may be easily dropped, thrown, or otherwise placed on the roadway surface without the necessity of leaving the vehicle.

The marker body comprises four identical panels 10 of triangular configuration, arranged in a pyramid or tetrehedron. The panels may be fabricated from any suitable foldable, stiffly resilient fabric such as vinyl plastic, nylon plastic, canvas, or the like. The fabric is characterized by the property of being resiliently foldable when the body is empty, for convenience of storage, transportation and merchandising. However it returns to shape if deformed. In their use position the panels are stiffly planar and structurally suitable for supporting, or being marked with, traffic warning indicia of the desired configuration.

The edges of the panels are fastened together, as by means of stitching, heat sealing etc.

The indicia borne by the panels may be of any character desired, or prescribed by law. In the illustrated form of the invention, the indicia comprise brightly colored fluorescent paint on the surfaces of the panels 10; for example, a red fluorescent paint. The margins of the panels mount indicia strips 12 which may be colored in any desired highly visible color, for example reflective silver. There thus is defined in highly visible form the characteristic warning triangle which is so widely recognized by motorists. The triangle is present on all sides of the marker structure, which are symmetrical.

In the illustrated form of the invention, the interior of the marker body defined by panels 10 is partly filled (FIG. 5) with a water insoluble, weighted material such as sand. This in effect makes of the marker a bean bag which can conveniently be tossed or dropped upon the pavement. When thus tossed or dropped, any one of its four identical warning faces might be made conspicuously visible. In effect, the marker always will land "right side up".

Means are provided for filling the interior of the marker body with the weighted granular or pelletized material.

Figure 3:
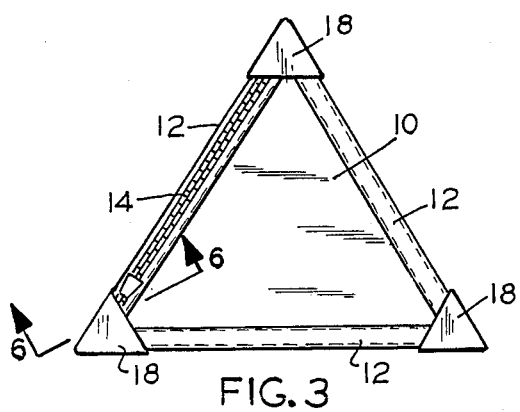
FIG. 3 is a bottom plan view showing a second face of the marker.
Figure 4:
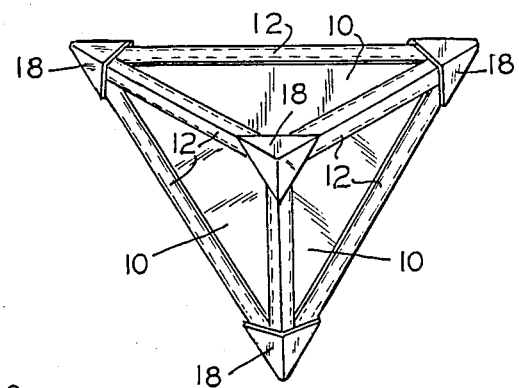
FIG. 4 is a top plan view of the marker.
Figure 6:
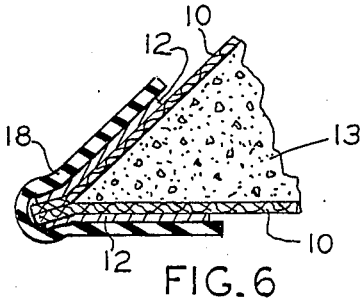
FIG. 6 is a fragmentary sectional view taken along line 6-6 of FIG. 3.

In the embodiment illustrated in FIG. 3, the filling means comprises zipper closure 14.

Figure 8:
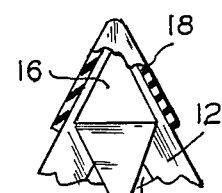
FIG. 8 is a fragmentary view of the marker in a second embodiment, illustrating a means of filling the marker body with granular material.
Figure 5:
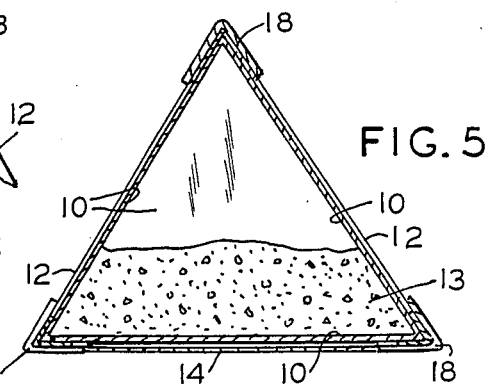
FIG. 5 is a sectional view taken along line 5—5 of FIG. 2.

In the embodiment of FIG. 8, the filling means comprises the flapped aperture 16.

Zipper 14 provides a complete seal together with emptying capability. Flapped aperture 16 provides substantially a complete seal, but without emptying capability on a practical basis, unless the aperture is substantially enlarged. However, it has the virtue of ease of manufacture and reduced expense, since the aperture and flap are constructed from the substance of panel 10 itself. It will be apparent that alternate marker body weighting means may be employed to achieve the purposes of the invention. Such means include, for example, weighted body cores of various configurations, weighted panel fabrics, and the like.

To protect against wear, and also to ensure positive placement of the marker in the location where it is thrown or dropped, i.e. to prevent skidding, there are provided cap pieces 18 at each of the four corners of the tetrahedron. These may be fabricated from pieces of sheet rubber or similar material. They may be sewn or glued on, in the manner illustrated in FIG. 6. Also, one of them may be employed to seal off filling aperture 16.

Figure 7:
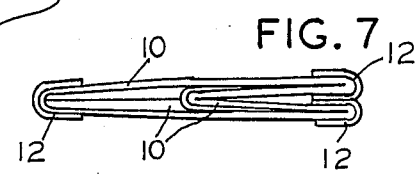
FIG. 7 is a side view, partly in section, of the marker of FIG. 2 illustrating the case thereof in folded condition.
Figure 2:
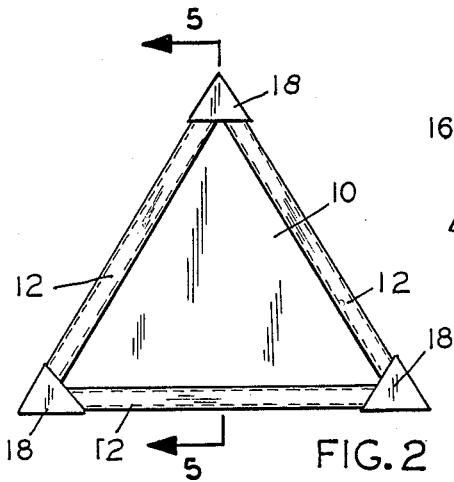
FIG. 2 is a view in elevation of the marker in one of its embodiments, showing one face of the marker.

In use, the "bean bag" type marker of FIGS. 1-8 may be supplied from the manufacturer in the collapsed or folded form of FIG. 7. In the folded condition, several of the markers may be contained conveniently in a single package.

When it is desired to use the markers, each one is unfolded and filled with sand or other granular or pelletized material either through zipper opening 14 or FIG. 3, or flapped aperture 16 of FIG. 8. The maker body then assumes the configuration of FIG. 5 with panels 10 stiffly erect to form the tetrahedron and to display the warning indicia present on each face.

Figure 1:
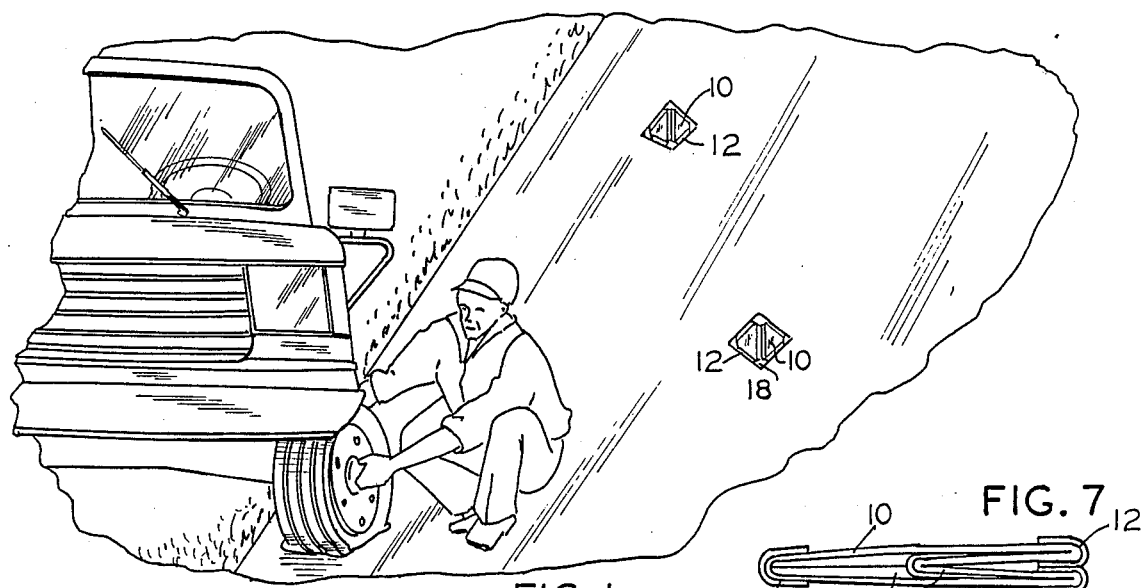
FIG. 1 is an illustration showing the manner of use and deployment of the herein described traffic warning markers.

The driver of the vehicle may store several of the markers in the driver's compartment of the vehicle he is driving. In the event of an emergency, he is able to throw, toss or drop them in a desired pattern adjacent the vehicle, as illustrated in FIG. 1. He is able to do this even though he is disabled or for some other reasons is unable to leave the driver's compartment of the vehicle. After each use, the markers may be gathered up and stored again, pending future needs.

Having thus described in detail a preferred embodiment of the present invention, it will be apparent to those skilled in the art that various physical changes could be made in the device described herein without altering the inventive concepts and principles embodied. The present embodiment is therefore to be considered in all respects as illustrative and not restrictive, the scope of the invention being indicated by the appended claims.

I claim:

1. A throwable, multi-sided, foldable, emergency traffic warning marker, comprising:
   (a) a marker body comprising four traffic-warning display faces of foldable, stiffly resilient sheet material of triangular configuration secured together along their abutting edges to form a hollow tetrahedron capable of being collapsed to folded condition,
   (b) traffic-warning indicia on each of said faces imparting enhanced visibility thereto,
   (c) indicia strips secured to the faces and bridging said secured abutting edges,
   (d) said indicia strips having a highly visible color contrasting the indicia on said faces to form visible triangular margins on each face, and
   (e) a weighted material partly filling the hollow tetrahedron.

2. The marker of claim 1 including closure means for opening and closing an opening through one of said faces for the filling and emptying of weighted material into and from the hollow tetrahedron.

3. The marker of claim 2 wherein the closure means comprises a zipper.

4. The marker of claim 2 wherein the closure means comprises a flap for releasably closing an opening through the face.

* * * * *